US012140103B1

(12) United States Patent
Miyauchi et al.

(10) Patent No.: US 12,140,103 B1
(45) Date of Patent: Nov. 12, 2024

(54) INJECTION CONTROLLER AND INJECTION CONTROL METHOD

(71) Applicant: HONDA MOTOR CO., LTD., Tokyo (JP)

(72) Inventors: Tomohiro Miyauchi, Wako (JP); Kenichiro Asai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/475,426

(22) Filed: Sep. 27, 2023

(51) Int. Cl.

| | |
|---|---|
| ***F02D 41/30*** | (2006.01) |
| ***F02B 61/04*** | (2006.01) |
| ***F02D 41/00*** | (2006.01) |
| ***F02D 41/10*** | (2006.01) |
| ***F02D 41/12*** | (2006.01) |

(52) U.S. Cl.
CPC ........ *F02D 41/3064* (2013.01); *F02B 61/045* (2013.01); *F02D 41/008* (2013.01); *F02D 41/009* (2013.01); *F02D 41/10* (2013.01); *F02D 41/12* (2013.01); *F02D 2200/0406* (2013.01); *F02D 2200/101* (2013.01)

(58) Field of Classification Search
CPC ...... F02D 41/008; F02D 41/009; F02D 41/04; F02D 41/10; F02D 41/12; F02D 41/30; F02D 41/3064; F02D 41/34; F02D 41/40; F02D 2200/0406; F02D 2200/101; F02B 61/045
See application file for complete search history.

(56) References Cited

U.S. PATENT DOCUMENTS 4,671,241 A * 6/1987 Yamato .................... F02D 41/26 123/492
4,753,206 A * 6/1988 Inoue ....................... F02D 41/10 123/480
4,886,030 A * 12/1989 Oba ......................... F02D 41/10 123/492
5,027,773 A * 7/1991 Shimomura ............ F02D 41/32 123/492
5,107,814 A * 4/1992 Nishiyama ............ F02D 41/045 123/435
5,181,496 A * 1/1993 Kojima ................... F02D 41/12 123/493

(Continued)

FOREIGN PATENT DOCUMENTS

JP 6354524 B2 6/2018

*Primary Examiner* — John M Zaleskas
(74) *Attorney, Agent, or Firm* — Rankin, Hill & Clark LLP

(57) ABSTRACT

An injection controller includes processor that determines a fuel injection quantity in each of cylinders of a multi-cylinder engine, and a memory. The processor acquires an intake air pressure of each of the cylinders, determines, for each of the cylinders, on the basis of the intake air pressure in one intake stroke, a fuel injection quantity for a next intake stroke in the cylinder, determines whether an instruction operation for making an instruction to increase or reduce a rotation speed of the engine has been performed on the basis of the intake air pressure in one of the cylinders, and performs transient response control to apply the fuel injection quantity for the next intake stroke in the one cylinder also to the fuel injection quantity in the next intake stroke in the cylinders other than the one cylinder when it is determined that the instruction operation has been performed.

9 Claims, 7 Drawing Sheets

(56) References Cited

U.S. PATENT DOCUMENTS

| | | | | |
|---|---|---|---|---|
| 5,211,150 | A * | 5/1993 | Anzai | F02D 41/32 123/480 |
| 5,245,969 | A * | 9/1993 | Nishiyama | F02D 41/18 123/406.43 |
| 5,394,849 | A * | 3/1995 | Tomisawa | F02D 41/107 123/492 |
| 2002/0112536 | A1* | 8/2002 | Shimoyama | F02D 41/045 73/114.26 |
| 2004/0194765 | A1* | 10/2004 | Nakamura | F02D 41/18 123/480 |
| 2004/0244773 | A1* | 12/2004 | Nakamura | F02D 9/10 123/403 |
| 2005/0021220 | A1* | 1/2005 | Nakamura | F02D 41/045 123/492 |
| 2005/0133011 | A1* | 6/2005 | Kitagawa | F02D 41/045 123/492 |
| 2006/0243245 | A1* | 11/2006 | Mine | F02D 41/08 123/339.14 |
| 2008/0215229 | A1* | 9/2008 | Matsushima | F02D 41/18 701/103 |
| 2016/0131071 | A1* | 5/2016 | Sugimoto | F02D 41/1498 123/436 |
| 2016/0363086 | A1* | 12/2016 | Otani | F02D 41/107 |
| 2017/0314497 | A1* | 11/2017 | Tomomatsu | F02M 35/1038 |

* cited by examiner

INJECTION CONTROLLER AND INJECTION CONTROL METHOD

BACKGROUND OF THE INVENTION

Field of the Invention

The present invention relates to an injection controller that controls fuel injection of an engine, and an injection control method.

Description of the Related Art

Japanese Patent No. 6354524 discloses a fuel injection device that, when, for example, acceleration is performed by a driving operation, determines a transient fuel injection quantity according to the driving operation and performs transient fuel injection on the basis of intake air pressure and engine rotation speed. In this fuel injection device, a fully-closed-state intake air pressure variation corresponding to an engine rotation speed variation for one cycle is subtracted from a measured intake air pressure variation for the one cycle caused by an accelerator operation, and a transient fuel injection quantity is determined from the measured intake air pressure variation after the subtraction and the engine rotation speed.

In the conventional technique described above, a delay for at least one cycle from an intake stroke in which the intake air pressure is detected to the next intake stroke in which fuel injection is performed occurs before the acceleration operation is reflected in the fuel injection quantity. In a conventional engine, this delay limits the responsivity of the engine to the acceleration operation.

An object of the present invention is to realize an injection controller that controls fuel injection of an engine and can enhance responsivity to an instruction operation for making an instruction to increase or reduce the engine rotation speed.

SUMMARY OF THE INVENTION

According to one aspect of the present invention, an injection controller is an injection controller that controls fuel injection in each cylinder of an engine including a plurality of cylinders, the injection controller including: a processor that determines a fuel injection quantity in each of the cylinders; and a memory, in which the processor acquires an intake air pressure of each of the cylinders from an intake air pressure sensor provided in an intake path, determines, for each of the cylinders, on the basis of the intake air pressure in one intake stroke, a fuel injection quantity for a next intake stroke in the cylinder, determines whether an instruction operation for making an instruction to increase or reduce a rotation speed of the engine has been performed on the basis of the intake air pressure in one of the cylinders, and performs transient response control to apply the fuel injection quantity for the next intake stroke in the one cylinder also to the fuel injection quantity in the next intake stroke in the cylinders other than the one cylinder when it is determined that the instruction operation has been performed.

According to another aspect of the present invention, an injection control method is an injection control method performed by a processor that controls a fuel injection quantity in each cylinder of an engine including a plurality of cylinders, the injection control method including: an acquiring step of acquiring an intake air pressure of each of the cylinders from an intake air pressure sensor provided in an intake path; an injection quantity determining step of determining, for each of the cylinders, on the basis of the intake air pressure in one intake stroke, a fuel injection quantity in a next intake stroke in the cylinder; an instruction determining step of determining whether an instruction operation for making an instruction to increase or reduce a rotation speed of the engine has been performed on the basis of the intake air pressure in one of the cylinders; and a transient response step of performing transient response control to apply the fuel injection quantity for the next intake stroke in the one cylinder determined in the injection quantity determining step also to the fuel injection quantity in the next intake stroke in the cylinders other than the one cylinder when it is determined that the instruction operation has been performed in the instruction determining step.

According to the aspects of the present invention, it is possible to realize an injection controller that controls fuel injection of an engine and can enhance responsivity to an instruction operation for making an instruction to increase or reduce the engine rotation speed.

DETAILED DESCRIPTION OF THE PREFERRED EMBODIMENTS

Hereinbelow, embodiments of the present invention will be described with reference to the drawings.

[1. Configuration of Engine]

Figure 1:
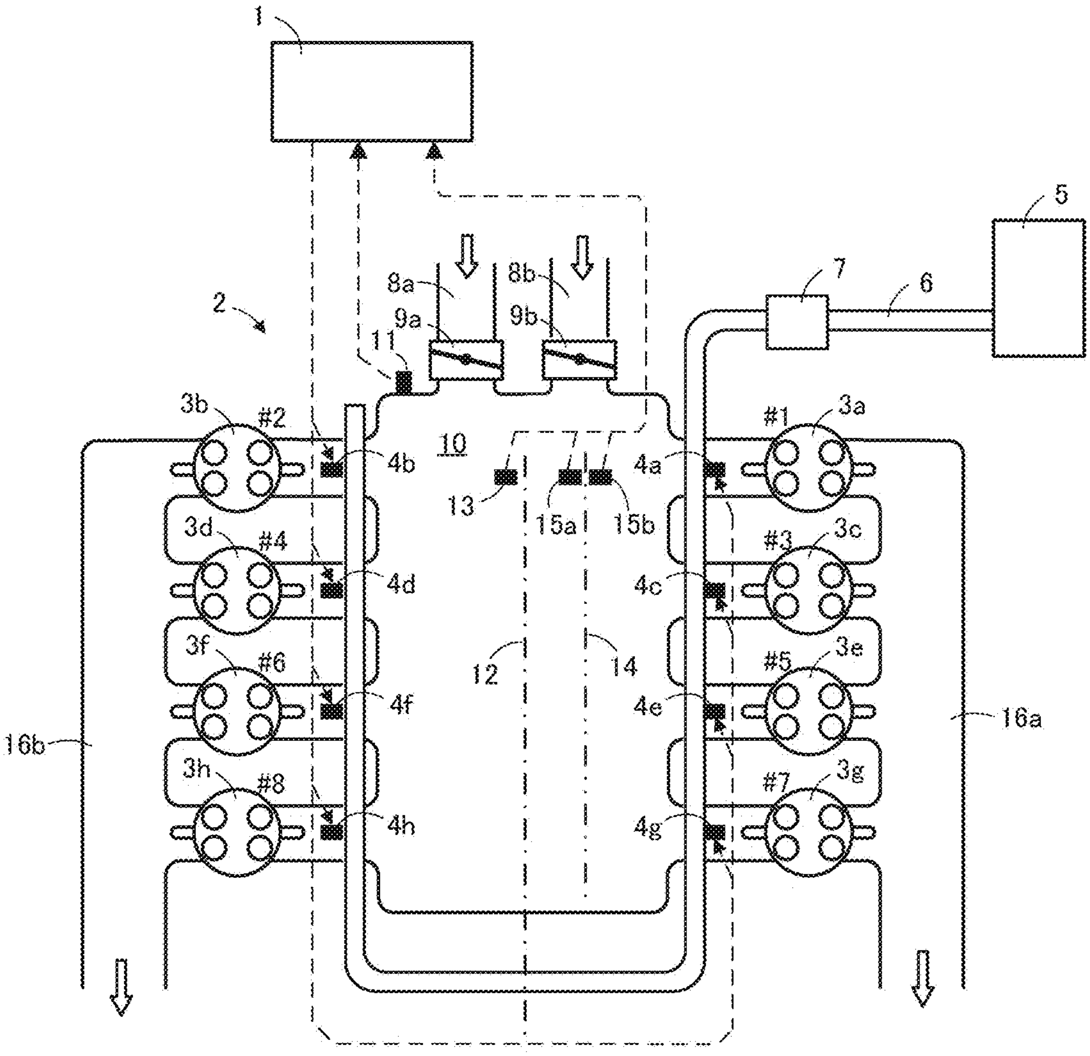
FIG. 1 is a diagram showing an example of the configuration of an engine controlled by an injection controller according to an embodiment of the present invention.

FIG. 1 is a diagram showing the configuration of an engine 2 controlled by an injection controller 1 according to an embodiment of the present invention. The injection controller 1 performs fuel injection control on the engine 2, which is a 4-stroke reciprocating engine. The engine 2 of the present embodiment is a V type 8-cylinder naturally aspirated engine for an outboard motor and a multi-cylinder engine including eight cylinders 3*a*, 3*b*, 3*c*, 3*d*, 3*e*, 3*f*, 3*g*, and 3*h*. The cylinders 3*a*, 3*b*, 3*c*, 3*d*, 3*e*, 3*f*, 3*g*, and 3*h* are numbered #1, #2, #3, #4, #5, #6, #7, and #8, respectively, in this order. Hereinbelow, the eight cylinders 3*a*, 3*b*, 3*c*, 3*d*, 3*e*, 3*f*, 3*g*, and 3*h* are also collectively referred to as the cylinders 3.

In the engine 2, explosion intervals between the cylinders 3 are irregular intervals. An irregular interval explosion engine, such as the engine 2, has the advantage of small crank angle dependent torque variation. In addition, in a V type 8-cylinder engine in which reducing vibration is a challenge, irregular explosion intervals make it possible to improve the crank balance rate and address this challenge without the use of a device such as a balancer. In the present embodiment, the cylinders 3*a* (#1), 3*e* (#5), 3*d* (#4), 3*b* (#2), 3*f* (#6), 3*c* (#3), 3*g* (#7), and 3*h* (#8) enter an explosion stroke in this order. The explosion intervals expressed in crank angles are as follows.

120 degrees between the cylinders 3*a* and 3*e*.
60 degrees between the cylinders 3*e* and 3*d*.
90 degrees between the cylinders 3*d* and 3*b*.
120 degrees between the cylinders 3*b* and 3*f*.
60 degrees between the cylinders 3*f* and 3*c*.
120 degrees between the cylinders 3*c* and 3*g*.
90 degrees between the cylinders 3*g* and 3*h*.
60 degrees between the cylinders 3*h* and 3*a*.

The engine 2 includes injectors 4*a*, 4*b*, 4*c*, 4*d*, 4*e*, 4*f*, 4*g*, and 4*h* respectively provided on the eight cylinders 3*a*, 3*b*, 3*c*, 3*d*, 3*e*, 3*f*, 3*g*, and 3*h*, each of the injectors including a fuel injection valve. Hereinbelow, the eight injectors 4*a*, 4*b*, 4*c*, 4*d*, 4*e*, 4*f*, 4*g*, and 4*h* are also collectively referred to as the injectors 4.

Each of the injectors 4 is supplied with fuel from a fuel tank 5 through a fuel pipe 6, the fuel being pressurized by a fuel pump 7.

The quantity of fuel injected by each of the eight injectors 4 in the intake stroke of the corresponding one of the eight cylinders 3 is determined by the injection controller 1. Each of the injectors 4 injects the fuel in the intake stroke of the corresponding one of cylinders 3 in response to an instruction from the injection controller 1.

The engine 2 includes an intake manifold 10. The intake manifold 10 distributes, to the eight cylinders 3, air flowing into the intake manifold 10 from two intake pipes 8*a* and 8*b* respectively through intake valves 9*a* and 9*b*. The intake valves 9*a* and 9*b* are throttle valves that are opened and closed in conjunction with an accelerator operation to adjust the amount of air flowing through the intake pipes 8*a* and 8*b*. Adjusting the opening degree (throttle opening degree) of the intake valves 9*a* and 9*b* adjusts the amount of intake air to the cylinders 3 and adjusts the rotation speed of the engine 2 (engine rotation speed). Hereinbelow, the intake pipes 8*a* and 8*b* are also collectively referred to as the intake pipes 8, and the intake valves 9*a* and 9*b* are also collectively referred to as the intake valves 9.

The intake manifold 10 is provided with an intake air pressure sensor 11 that detects an intake air pressure, the intake air pressure being an air pressure inside the intake manifold 10. An output of the intake air pressure sensor 11 is constantly output to the injection controller 1. The intake pipes 8*a* and 8*b* and the intake manifold 10 correspond to the intake path in the present disclosure.

A crank shaft 12 (indicated by a dashed dotted line in the drawing) of the engine 2 is provided with a rotation sensor 13 that detects the rotation speed of the engine 2. The rotation sensor 13 is, for example, a crank angle sensor that outputs a pulse signal as the crank shaft 12 rotates.

The engine 2 includes a cam shaft 14 (indicated by a dashed double-dotted line in the drawing) that rotates in synchronization with the crank shaft 12, and TDC sensors 15*a* and 15*b* provided on the cam shaft 14. The TDC sensors 15*a* and 15*b* send pulses to the injection controller 1 when the rotation angle of the cam shaft 14 reaches a specific angle in accordance with the conventional technique. The injection controller 1 detects the timing at which the piston of each cylinder 3 reaches the top dead center (I-TDC) of the intake stroke on the basis of the reception timing of the above-mentioned pulse (e.g., refer to Japanese Patent Laid-Open No. 2021-161948). Hereinbelow, the TDC sensors 15*a* and 15*b* are also referred to as the TDC sensors 15.

The engine 2 also includes an exhaust pipe 16*a* connected to the cylinders 3*a*, 3*c*, 3*e*, and 3*g*, and an exhaust pipe 16*b* connected to the cylinders 3*b*, 3*d*, 3*f*, and 3*h*. Hereinbelow, the exhaust pipes 16*a* and 16*b* are also collectively referred to as the exhaust pipes 16. Exhaust air sent out in an exhaust stroke of the cylinders 3 is discharged to the outside of the engine 2 through the exhaust pipes 16.

[2. Configuration of Injection Controller]

Figure 2:
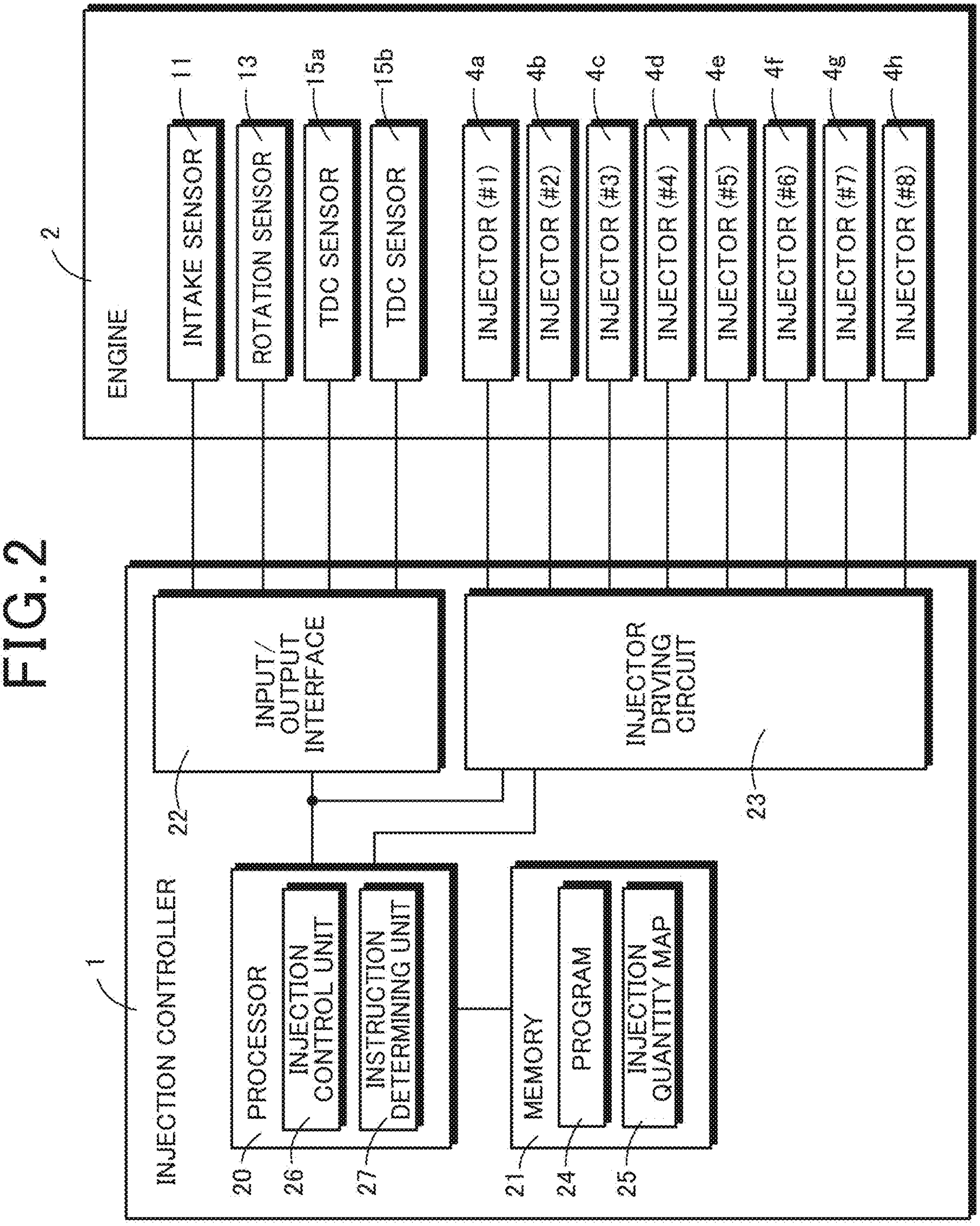
FIG. 2 is a diagram showing the configuration of the injection controller according to the embodiment of the present invention.

FIG. 2 is a diagram showing the configuration of the injection controller 1.

The injection controller 1 includes a processor 20 that determines the fuel injection quantity in each of the cylinders 3, a memory 21, an input/output interface 22, and an injector driving circuit 23. The processor 20 receives sensor outputs from the intake air pressure sensor 11, the rotation sensor 13, and the TDC sensors 15*a* and 15*b* through the input/output interface 22.

At the timing when each of the cylinders 3 enters the intake stroke, the injector driving circuit 23 drives the corresponding injector 4 to perform fuel injection in accordance with the conventional technique. The quantity of fuel that should be injected by the injector 4 in each of the cylinders 3 is set by the processor 20 to the injector driving circuit 23. The injector driving circuit 23 includes, for example, eight input buffers (not shown) corresponding one-to-one to the eight injectors 4, each of the input buffers storing a set value of the fuel injection quantity input from the processor 20.

For each of the cylinders 3, the injector driving circuit 23 reads the set value of the fuel injection quantity from the input buffer corresponding to the injector 4 of the cylinder 3 at the timing when the cylinder 3 enters the intake stroke and performs valve opening and closing control on the injector 4 of the cylinder 3 so that the read quantity of fuel is injected. The injector driving circuit 23 acquires sensor signals from the TDC sensors 15*a* and 15*b* through the input/output interface 22 and detects the timings of the intake stroke and the explosion stroke for each of the cylinders 3 on the basis of the above-mentioned sensor outputs acquired.

The memory 21 includes, for example, a volatile and/or nonvolatile semiconductor memory. A program 24 and an injection quantity map 25 are stored in the memory 21.

The processor 20 is, for example, a computer including a CPU and the like. The processor 20 may have a configuration including a ROM in which a program is written, a RAM for temporarily storing data, and the like. In addition, the processor 20 includes an injection control unit 26 and an instruction determining unit 27 as functional elements or functional units.

These functional elements of the processor 20 are implemented by, for example, the processor 20, which is a computer, executing the program 24 stored in the memory 21. Note that the program 24 can be stored in any computer readable storage medium. Alternatively, all or some of the functional elements of the processor 20 can also be configured as hardware each including one or more electronic circuit components.

The injection control unit 26 acquires the intake air pressure of each of the cylinders 3 from the intake air pressure sensor 11 provided in the intake path and determines the fuel injection quantity in each of the cylinders 3.

Specifically, for each of the cylinders 3, on the basis of the intake air pressure in one intake stroke, the injection control unit 26 determines the fuel injection quantity in the next intake stroke before the next intake stroke and sets the determined fuel injection quantity to the injector driving circuit 23.

In the present embodiment, for each of the cylinders 3, the injection control unit 26 determines the fuel injection quantity of the cylinder 3 using the speed-density method on the basis of the intake air pressure in the intake stroke of the cylinder 3 detected inside the intake manifold 10 and the rotation speed of the engine 2.

Specifically, for each of the cylinders 3, the injection control unit 26 detects the intake air pressure of the cylinder 3 and the rotation speed of the crank shaft 12 of the engine 2 at the timing when the piston of the cylinder 3 reaches a top dead center position of the intake stroke. Hereinbelow, the top dead center position of the intake stroke of the piston may be abbreviated as the I-TDC. Also, hereinbelow, the timing at which the piston reaches the top dead center position of the intake stroke may be referred to as the I-TDC timing.

More specifically, the injection control unit 26 detects the I-TDC timing of each of the cylinders 3 on the basis of the sensor outputs from the TDC sensors 15*a* and 15*b* in accordance with the conventional technique. In addition, the injection control unit 26 monitors the sensor output from the intake air pressure sensor 11, the intake air pressure sensor 11 being disposed inside the intake manifold 10 and detects air pressure inside the intake manifold 10, at predetermined time intervals. Then, the injection control unit 26 acquires the air pressure detected by the intake air pressure sensor 11 at the I-TDC timing of the cylinder 3 as the intake air pressure at the I-TDC in this cylinder. Accordingly, in the injection controller 1, since the intake air pressure inside the intake manifold 10, the intake manifold 10 being located closer to the cylinder 3 than the intake pipe 8 is, is detected, the responsivity of intake air pressure detection can be enhanced compared to a configuration that detects the intake air pressure inside the intake pipe 8.

In addition, the injection control unit 26 constantly monitors the rotation speed of the engine 2 using the rotation sensor 13 at predetermined time intervals. The injection control unit 26 calculates the rotation speed of the engine 2 at the I-TDC timing of the above-mentioned cylinder 3 on the basis of a sensor signal from the rotation sensor 13.

Then, on the basis of the detected intake air pressure and the rotation speed of the engine 2, the injection control unit 26 refers to the injection quantity map 25 stored in the memory 21 and determines the fuel injection quantity in the next intake stroke for the cylinder 3.

Figure 3:
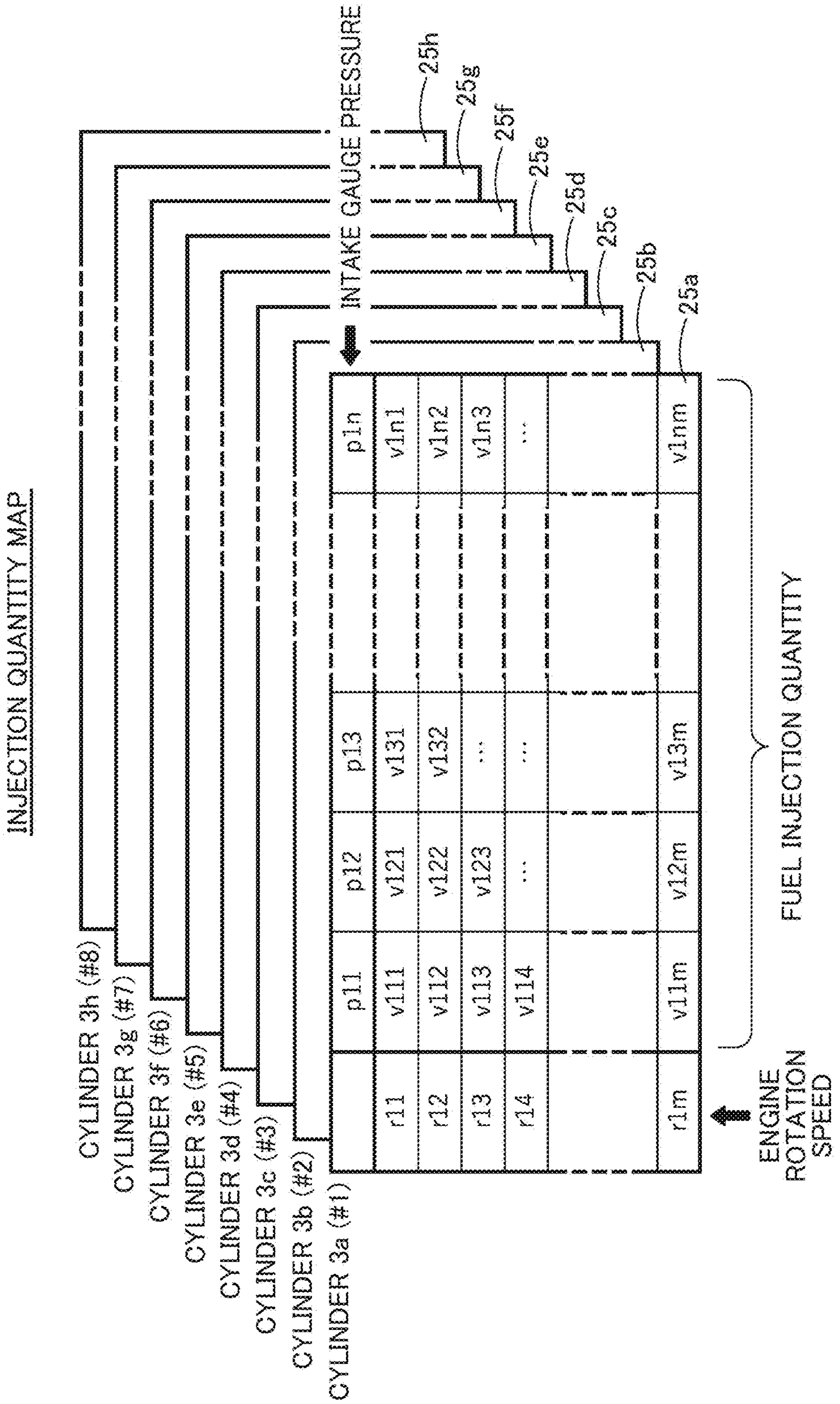
FIG. 3 is a diagram showing an example of an injection quantity map.

FIG. 3 is a diagram showing an example of the injection quantity map 25. The injection quantity map 25 includes eight injection quantity maps 25*a*, 25*b*, 25*c*, 25*d*, 25*e*, 25*f*, 25*g*, and 25*h* corresponding to the eight cylinders 3*a*, 3*b*, 3*c*, 3*d*, 3*e*, 3*f*, 3*g*, and 3*h*, respectively. For each of the cylinders 3, the injection control unit 26 refers to one of the eight injection quantity maps 25 corresponding to the cylinder 3 and determines the fuel injection quantity in the next intake stroke for the cylinder 3.

Each of the injection quantity maps 25 can be represented, for example, in table format. As shown in FIG. 3 for the injection quantity map 25*a* as an example, the engine rotation speed is shown in the first column, which is the leftmost column of each of the injection quantity maps 25, and an intake gauge pressure is shown in the first row, which is the uppermost row. In addition, in the second and lower rows, the fuel injection quantity corresponding to a value of the intake gauge pressure for each value of the engine speed is shown in the row direction.

The intake gauge pressure refers to a pressure obtained by subtracting, from the air pressure detected by the intake air pressure sensor 11, the atmospheric pressure at the time. The injection control unit 26 can calculate the intake gauge pressure by subtracting the atmospheric pressure detected by an atmospheric pressure sensor (not shown) from the intake air pressure detected by the intake air pressure sensor 11.

Here, reference characters beginning with "r", such as r11 and r12, described in the table of the injection quantity map 25*a* represent specific numerical values of the engine rotation speed. In addition, reference characters beginning with "p", such as p11 and p12, represent specific numerical values of the intake gauge pressure. In addition, reference characters beginning with "v", such as v111 and v122, represent specific numerical values of the fuel injection quantity.

In the injection quantity map 25*a*, for example, when the engine rotation speed detected at the I-TDC timing of the cylinder 3*a* is the value r12 and the intake gauge pressure calculated from the intake air pressure detected by the intake air pressure sensor 11 is the value p12, the value of v122 is determined as the fuel injection quantity. Here, the fuel injection quantity does not necessarily have to be expressed in terms of volume and can be expressed in terms of the valve opening time (injection time) of the corresponding injector 4.

Figure 4:
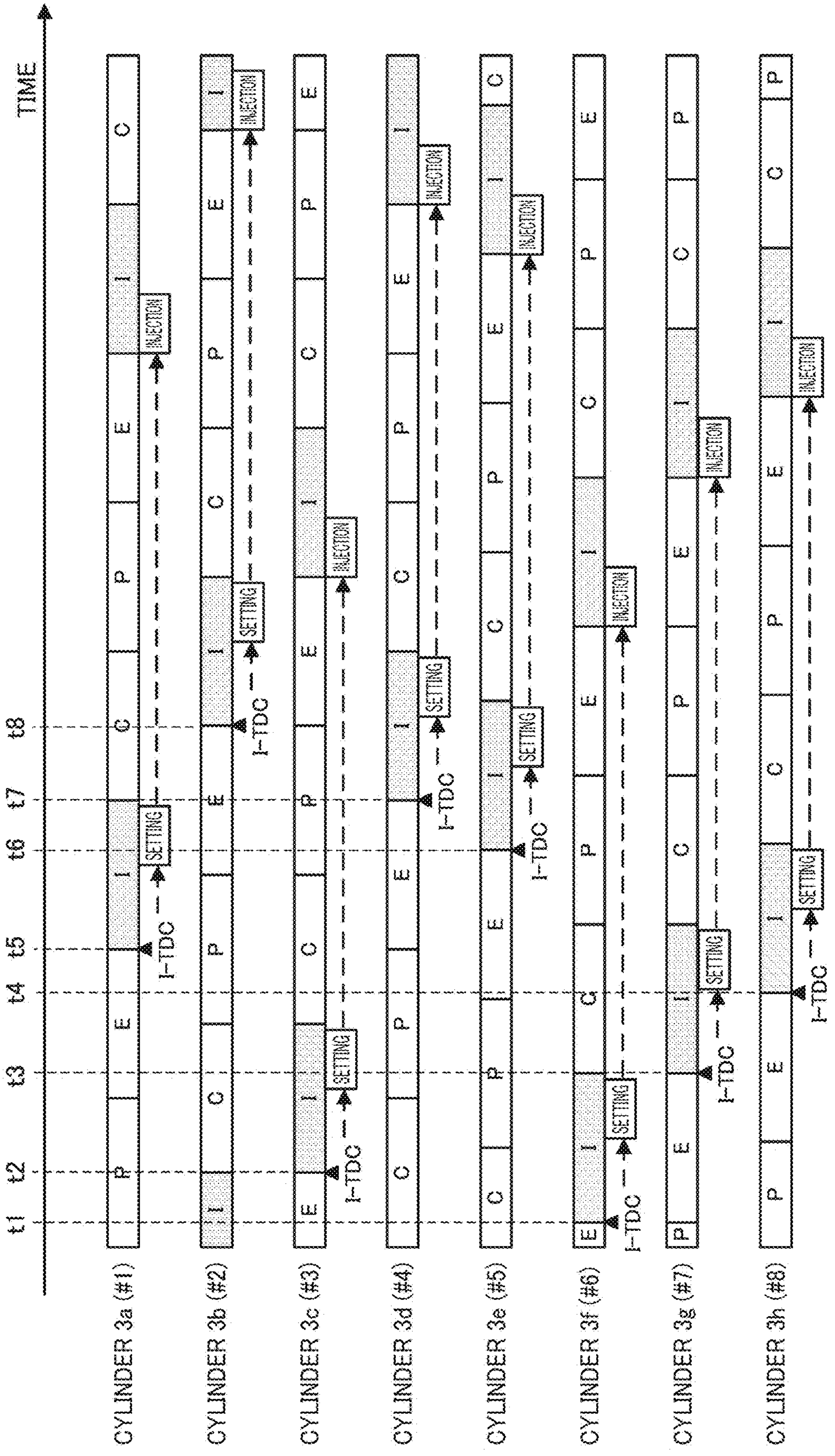
FIG. 4 is a diagram showing an example of an operation of stationary injection control performed by the injection controller.

FIG. 4 is a diagram showing an example of the operation of fuel injection control performed by the injection control unit 26 on the eight cylinders 3. FIG. 4 particularly shows an operation example in stationary injection control, the stationary injection control being control performed when the accelerator operation changes slowly and no instruction to largely increase or reduce the rotation speed of the engine 2 is made (that is, control performed when an instruction operation described further below is not detected).

In FIG. 4, a line arrow extending in the left-right direction on the top of the drawing is a time axis, and time elapses from left to right in the drawing. Eight bands shown below the time axis in the drawing represent the timing of execution of a 4-stroke process in the cylinders 3*a*, 3*b*, 3*c*, 3*d*, 3*e*, 3*f*, 3*g*, and 3*h* in this order from the top in the drawing.

In each of the bands, "I" is an intake stroke, "C" is a compression stroke, "P" is an explosion stroke, and "E" is an exhaust stroke. A black triangle shown with the letters "I-TDC" under each band is the I-TDC timing in the cylinder 3 corresponding to the band. As described above, the injection control unit 26 detects the intake air pressure of the corresponding one of cylinders 3 and the engine rotation speed at the I-TDC timing and calculates the fuel injection quantity used in the next intake stroke of this cylinder 3. A "SETTING" band located at the end of a dotted arrow shown to the right in the drawing from the I-TDC timing indicated by the above-mentioned black triangle indicates the timing at which the injection control unit 26 sets the calculated fuel injection quantity to the injector driving circuit 23.

The injector driving circuit 23 with the fuel injection quantity set drives the injector 4 of the cylinder 3 to inject the set quantity of fuel based on the fuel injection quantity at the timing with an "INJECTION" band located at the end of a dotted arrow shown to the right from the "SETTING" band in the drawing.

In the example shown in FIG. 4, the cylinders 3*f*, 3*c*, 3*g*, 3*h*, 3*a*, 3*e*, 3*d*, and 3*b* reach the I-TDC timing at times t1, t2, t3, t4, t5, t6, 7, and t8, respectively. For each of the cylinders 3, the injection control unit 26 determines the fuel injection quantity of the cylinder 3 using the arrival of the I-TDC timing as a trigger and sets the determined fuel injection quantity to the injector driving circuit 23. When the next intake stroke in the cylinder 3 arrives, the injector driving circuit 23 performs fuel injection at the set fuel injection quantity described above in the cylinder 3.

In the stationary injection control shown in FIG. 4 as an example, as with the conventional technique, in each of the cylinders 3, the fuel injection quantity determined on the basis of the intake air pressure detected in one intake stroke and the engine rotation speed is applied to fuel injection in the next intake stroke. Thus, when the intake air amount is increased by an instruction operation on the accelerator, a delay for at least one cycle occurs before the rotation speed of the engine 2 increases in response to the instruction operation. This delay limits the responsivity of the engine 2 to the instruction operation.

Thus, in the present embodiment, in particular, when the instruction determining unit 27, which will be described further below, determines that an instruction operation for making an instruction to increase or reduce the rotation speed of the engine 2 has been performed on the basis of the intake air pressure in the cylinder 3, the injection control unit 26 performs transient response control. In the transient response control, the injection control unit 26 applies the fuel injection quantity in the next intake stroke determined for one cylinder 3 also to the fuel injection quantity in the next intake stroke in the cylinders 3 other than the one cylinder 3. Accordingly, in the injection controller 1, the responsivity of the engine to the instruction operation can be enhanced.

Referring to FIG. 2, the instruction determining unit 27 of the processor 20 determines whether an instruction operation for making an instruction to increase or reduce the rotation speed of the engine 2 has been performed on the basis of the intake air pressure of the cylinder 3. Specifically, in the present embodiment, the instruction determining unit 27 determines that the instruction operation has been performed on the basis of the intake air pressure of one cylinder 3 and the intake air pressure of another cylinder 3 that starts the intake stroke immediately before the intake stroke of the one cylinder 3. Specifically, for example, the instruction determining unit 27 determines that the instruction operation has been performed when an absolute value of the difference between the intake air pressure of one cylinder 3 and the intake air pressure of another cylinder 3 that starts the intake stroke immediately before the intake stroke of the one cylinder 3 exceeds a predetermined variation threshold.

For example, in a case in which the intake strokes of the cylinders 3 arrive in sequence at the timings shown in FIG. 4, when the intake air pressure of the cylinder 3*g* whose I-TDC timing arrives at the time t3 varies by a variation that exceeds the predetermined variation threshold relative to the intake air pressure of the cylinder 3*c* whose I-TDC timing arrives at the time t2 before the time t3, the instruction determining unit 27 determines that the instruction operation has been performed on the engine 2 at the time t3.

Accordingly, in the injection controller 1, since the instruction operation is detected on the basis of the variation in actual intake air pressure between any two cylinders 3 without providing a sensor for an accelerator operation, the configuration of the engine 2 to be controlled can be simplified.

Figure 5:
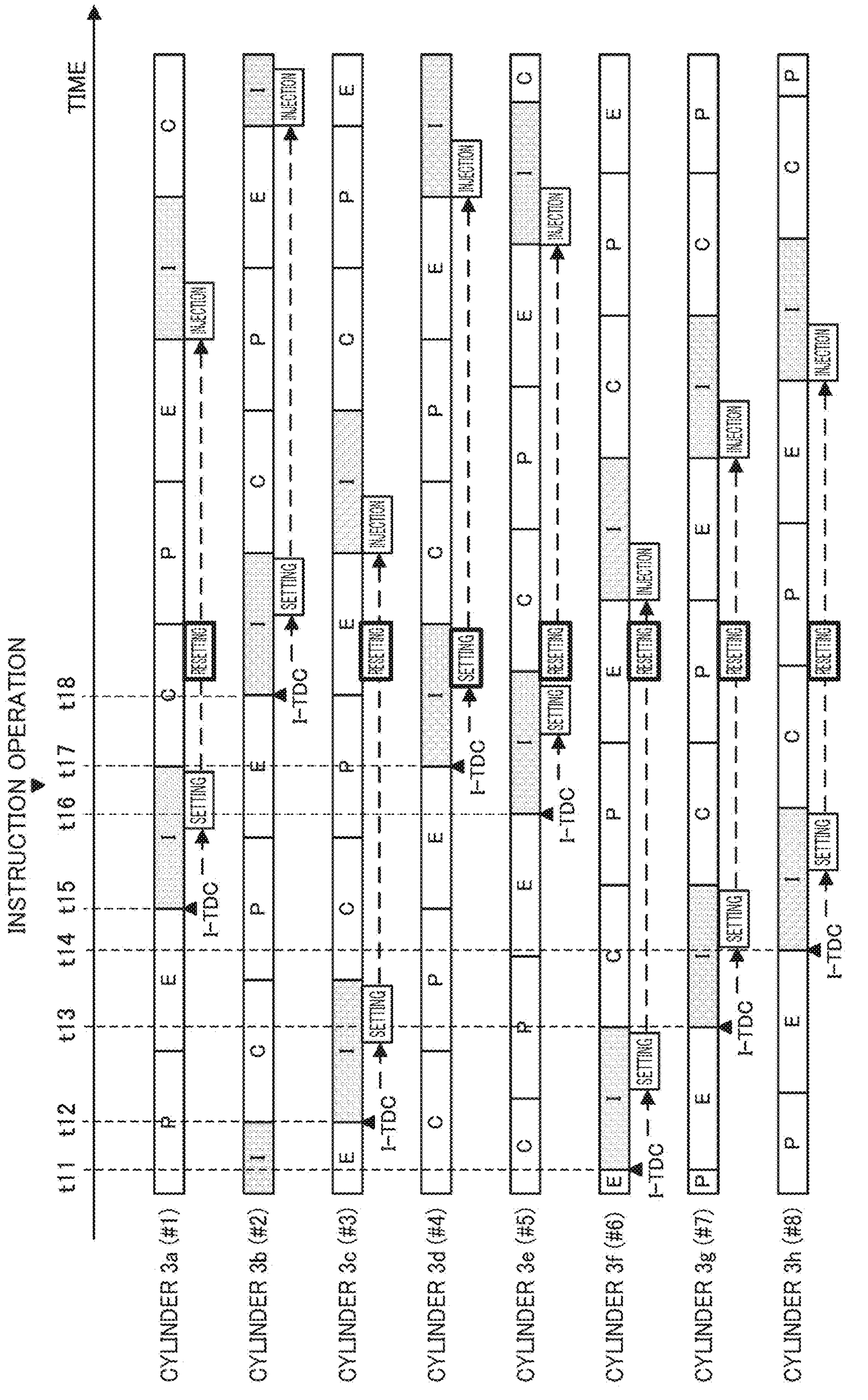
FIG. 5 is a diagram showing an example of an operation of transient response control performed by the injection controller.

FIG. 5 is a diagram illustrating an example of the operation of transient response control performed by the injection control unit 26 on the eight cylinders 3. The notation of each part of FIG. 5 is similar to the notation shown in FIG. 4, and description for FIG. 4 described above will thus be quoted.

In the example of FIG. 5, as with FIG. 4, the cylinders 3*f*, 3*c*, 3*g*, 3*h*, 3*a*, 3*e*, 3*d*, and 3*b* sequentially reach the I-TDC timing at times t11, t12, t13, t14, t15, t16, t17, and t18, respectively. In addition, in FIG. 5, as an example, it is assumed that an instruction operation is performed before the time t17 at which the cylinder 3*d* reaches the I-TDC timing.

The instruction determining unit 27 determines that the instruction operation has been performed on the engine 2 on the basis of the difference between the intake air pressure of the cylinder 3*d* that reaches the I-TDC timing at the time t17 after the instruction operation and the intake air pressure of the cylinder 3*e* that enters the intake stroke immediately before the cylinder 3*d* at the time t16, the time t16 being the I-TDC timing of the cylinder 3*e*.

The injection control unit 26 performs the transient response control using the determination of the presence or absence of the instruction operation as a trigger. As the transient response control, the injection control unit 26 applies the fuel injection quantity for the next intake stroke determined for the cylinder 3*d* also to the fuel injection quantity of the next intake stroke of the cylinders 3 other than the cylinder 3*d*.

Specifically, the injection control unit 26 sets the fuel injection quantity determined for the cylinder 3*d* to the injector driving circuit 23 as the fuel injection quantity of the cylinder 3*d* and also resets the fuel injection quantity already set at the injector driving circuit 23 for the cylinders 3 other than the cylinder 3*d* with the value of the determined fuel injection quantity of the cylinder 3*d*. The reset fuel injection quantity is, for example, overwritten to, among the input buffers described above, the input buffers corresponding to the cylinders 3 other than the cylinder 3*d* in the injector driving circuit 23.

In FIG. 5, a rectangle with "RESETTING" shown under each band indicating the stroke timing of each of the cylinders 3*a*, 3*c*, 3*e*, 3*f*, 3*g*, and 3*h* indicates the timing at which resetting with the fuel injection quantity determined in the cylinder 3*d* is performed on the injector driving circuit 23 for the cylinders 3 other than the cylinder 3*d*.

Accordingly, also for the cylinders 3*a*, 3*c*, 3*e*, 3*f*, 3*g*, and 3*h* in which the fuel injection quantity for the next intake stroke is already set when the instruction determining unit 27 determines that the instruction operation is present, the fuel injection quantity in the next intake stroke determined for the cylinder 3*d* is immediately applied to fuel injection of the next intake stroke in each of the cylinders 3. Thus, the responsivity of the engine 2 to the instruction operation is enhanced.

Note that when the fuel injection quantity for one cylinder 3 is determined after it is determined that the instruction operation is present on the basis of the intake air pressure of the one cylinder 3, the injection control unit 26 may not perform resetting with the determined fuel injection quantity for another cylinder 3 that has already started the next intake stroke (hereinbelow, referred to as the excluded cylinder). It is because, for the cylinder 3 as the excluded cylinder, the fuel injection quantity in the next intake stroke can be appropriately determined on the basis of the intake air pressure of the excluded cylinder itself, the intake air pressure being detected after it is determined that the instruction operation is present on the basis of the intake air pressure of the one cylinder 3. In the example of FIG. 5, the cylinder 3*b* that starts the next intake stroke after it is determined that the instruction operation is present on the basis of the intake air pressure of the cylinder 3*d* at the time t17 and before the fuel injection quantity for the cylinder 3*d* is set is the excluded cylinder.

After performing the resetting described above, the injection control unit 26 returns to the operation of stationary injection control.

However, for example, when the instruction operation started before the time t17 continues at the time t18 and the intake air pressure of the cylinder 3*b* detected at the time t18 varies by a variation that exceeds the above-mentioned variation threshold relative to the intake air pressure of the cylinder 3*d* detected at the time t17, the instruction determining unit 27 determines that the instruction operation has been performed on the engine 2 also at the time t18. In this case, the injection control unit 26 continues transient response control similar to the above and applies the fuel injection quantity calculated for the cylinder 3*b* on the basis of the intake air pressure detected at the time t18 also to the other cylinders 3.

Figure 6:
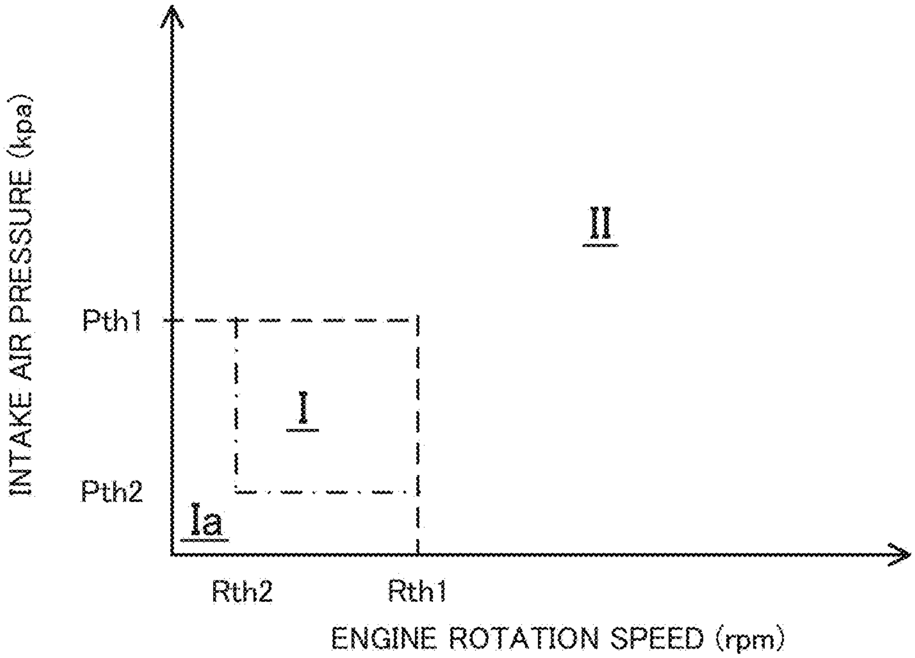
FIG. 6 is a diagram showing an operation range of the engine in which the injection controller performs determination of the presence or absence of an instruction operation.

Note that the instruction determining unit 27 may determine whether the instruction operation has been performed when the rotation speed of the engine 2 and the intake air pressure detected by the intake air pressure sensor 11 are within a predetermined range. FIG. 6 is a diagram showing the range of the engine rotation speed and the intake air pressure on the basis of which the instruction determining unit 27 performs determination of the presence or absence of the instruction operation. In FIG. 6, the horizontal axis represents the engine rotation speed, and the vertical axis represents the intake air pressure.

The instruction determining unit 27 may not perform determination of the presence or absence of the instruction operation in an operation range of a region II shown in FIG. 6 in which the engine rotation speed is equal to or more than an upper limit rotation speed threshold Rth1 or the intake air pressure is equal to more than an upper limit pressure threshold Pth1. That is, the instruction determining unit 27 may perform determination of the presence or absence of the instruction operation in an operation range of a region I shown in FIG. 6 in which the rotation speed of the engine 2 is less than the predetermined upper limit rotation speed threshold Rth1 and the intake air pressure detected by the intake air pressure sensor 11 is less than the predetermined upper limit pressure threshold Pth1. This makes it possible to prevent incorrect determination of the presence or absence of the instruction operation in the region II with high rotation speed and high load in which the intake air pressure of the cylinder 3 (in the present embodiment, the air pressure inside the intake manifold 10) is likely to fluctuate. Thus, for example, it is possible to prevent the responsivity of the engine 2 from being unnecessarily increased by execution of the transient response control despite the absence of the instruction operation.

Hereinbelow, the operation range of the region I shown in FIG. 6 is referred to as the determinable range.

In addition, the instruction determining unit 27 may not perform determination of the presence or absence of the instruction operation as an exception in an operation range of a region Ia shown in FIG. 6 in which the rotation speed of the engine 2 is equal to or less than a predetermined lower limit rotation speed threshold Rth2 or the intake air pressure detected by the intake air pressure sensor 11 is equal to or less than a predetermined lower limit pressure threshold Pth2 in the region I, the region I being the determinable range. Accordingly, during low-rotation-speed or low-load operation in which the stability of the rotation speed of the engine 2 can be more important than the responsivity of the engine 2, it is possible to prevent the responsivity of the engine from being unnecessarily increased by execution of the transient response control and achieve excellent operability. Thus, for example, when a boat equipped with the engine 2, which is an outboard motor, navigates at low speed in a marina or moves at extremely low speed in a place where an obstacle is present around the boat, for example, during berthing, it is possible to achieve excellent operability to the engine 2 and reduce the possibility of collision with surrounding objects.

In addition, the variation threshold for intake air pressure variation used by the instruction determining unit 27 to determine the presence or absence of the instruction operation preferably has different values corresponding to the difference in crank angle at the I-TDC between the two cylinders 3 in which the intake air pressure used to calculate the intake air pressure variation is measured.

Hereinbelow, for each of the cylinders 3, the difference in crank angle at the I-TDC (corresponding to the explosion interval) from the cylinder 3 that reaches the I-TDC timing immediately therebefore is referred to as the TDC difference.

When the presence or absence of the instruction operation is determined between the intake strokes of two cylinders 3 with a larger TDC difference, a delay time from actual execution of the instruction operation to intake air pressure detection increases, which largely increases the intake air pressure inside the intake manifold 10 before the intake air pressure detection. Thus, if a variation threshold always having the same value is used, it may not be possible to appropriately determine the presence or absence of the instruction operation depending on the TDC difference between the two cylinders 3 when the instruction operation is performed.

On the other hand, by setting the variation threshold to different values corresponding to the TDC difference between the two cylinders 3 in which the intake air pressure used to calculate the intake air pressure variation is measured as described above, the determination of the presence or absence of the instruction operation can be more appropriately performed also in an irregular interval explosion engine such as the engine 2.

In the present embodiment, a variation threshold ΔPth1 for determination of the presence or absence of the instruction operation, the determination being performed at the time of acquiring the intake air pressures of the cylinders 3*a* (#1), 3*c* (#3), and 3*d* (#4) with the TDC difference of 60 degrees, a variation threshold ΔPth2 for determination of the presence or absence of the instruction operation, the determination being performed at the time of acquiring the intake air pressures of the cylinders 3*b* (#2) and 3*h* (#8) with the TDC difference of 90 degrees, and a variation threshold ΔPth3 for determination of the presence or absence of the instruction operation, the determination being performed at the time of acquiring the intake air pressures of the cylinders 3*e* (#5), 3*f* (#6), and 3*g* (#7) with the TDC difference of 120 degrees, for example, have the relationship shown in the following Formula (1).

$$\Delta th1 < \Delta th2 < \Delta th3 \qquad (1)$$

The variation threshold may have difference values according to whether the instruction operation is an instruction to increase the engine rotation speed involving an increase in the intake air pressure or an instruction to reduce the engine rotation speed involving a reduction in the intake air pressure.

[3. Operation of Injection Controller]

Figure 7:
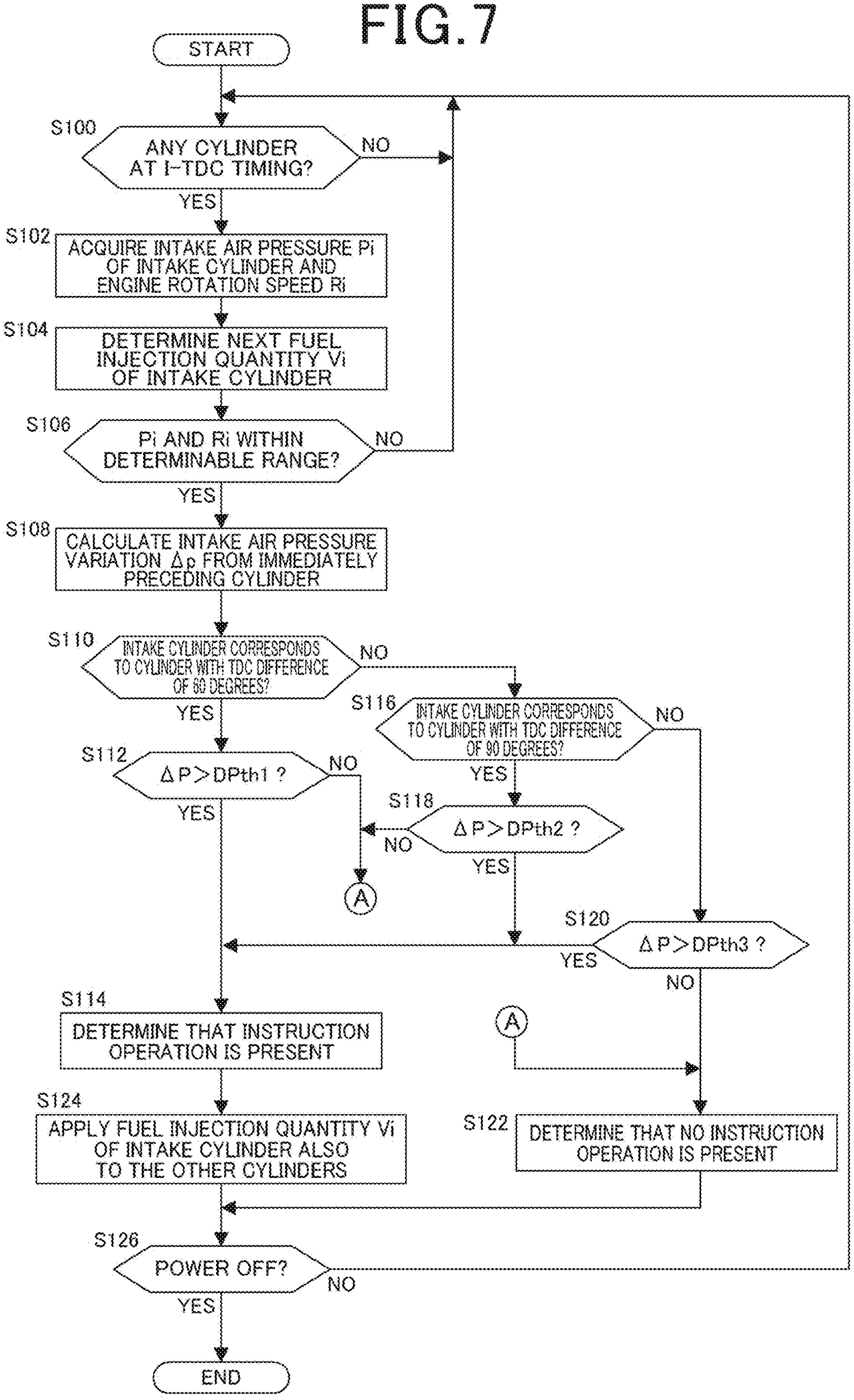
FIG. 7 is a flowchart showing steps of a process of an injection control method performed by the injection controller.

Next, steps of the operation of the injection controller 1 will be described. FIG. 7 is a flowchart showing steps of a process of an injection control method performed by the processor 20 of the injection controller 1. The process shown in FIG. 7 is started when the power of the injection controller 1 is turned on.

When the process is started, first, the injection control unit 26 of the processor 20 determines whether any of the cylinders 3 is at the I-TDC timing (S100). Then, when there is no cylinder 3 at the I-TDC timing (S100, NO), the injection control unit 26 returns to step S100 and repeats the process, and waits for any of the cylinders 3 to reach the I-TDC timing.

On the other hand, when any of the cylinders 3 is at the I-TDC timing (S100, YES), the injection control unit 26 acquires an intake air pressure Pi of the cylinder 3 at the I-TDC timing (hereinbelow, abbreviated as the intake cylinder 3 or the intake cylinder) and a rotation speed Ri of the engine 2 (S102). Next, on the basis of the acquired intake air pressure Pi and engine rotation speed Ri, the injection control unit 26 refers to the injection quantity map 25 for the intake cylinder 3, and calculates a fuel injection quantity Vi to be applied to the next intake stroke for the intake cylinder 3 and sets the calculated fuel injection quantity Vi to the injector driving circuit 23 (S104).

Here, the processes from step S100 to S104 correspond to the operation of the stationary injection control described above.

Next, the instruction determining unit 27 determines whether the intake air pressure Pi of the intake cylinder 3 and the engine rotation speed Ri are within the determinable range (that is, within the operation range of the region I shown in FIG. 6) (S106). Then, when the intake air pressure Pi and the engine rotation speed Ri are not within the determinable range (S106, NO), the injection control unit 26 returns to step S100 and repeats the process.

On the other hand, when the intake air pressure Pi and the engine rotation speed Ri are within the determinable range in step S106 (S106, YES), the instruction determining unit 27 calculates an intake air pressure difference ΔP (=|Pi−Pb|), the intake air pressure difference ΔP being an absolute value of the difference between the intake air pressure Pi of the intake cylinder 3 and an intake air pressure Pb of another cylinder 3 whose I-TDC timing arrives immediately before the I-TDC timing of the intake cylinder 3 (hereinbelow, referred to as the immediately preceding cylinder or the immediately preceding cylinder 3) (S108).

Next, the instruction determining unit 27 determines whether the intake cylinder 3 is the cylinder 3*a* (#1), 3*c* (#3), or 3*d* (34) with the TDC difference of 60 degrees (S110). Then, when the intake cylinder 3 is the cylinder 3*a*, 3*c*, or 3*d* with the TDC difference of 60 degrees (S110, YES), the instruction determining unit 27 determines whether the intake air pressure difference ΔP exceeds a variation threshold DPth1 corresponding to the cylinder 3 with the TDC difference of 60 degrees (S112). Then, when the intake air pressure difference ΔP exceeds the variation threshold DPth1 (S112, YES), the instruction determining unit 27 determines that an instruction operation to increase or reduce the engine rotation speed is present (S114).

On the other hand, when the intake air pressure difference ΔP does not exceed the variation threshold DPth1 in S112 (S112, NO), the instruction determining unit 27 determines that no instruction operation to increase or reduce the engine rotation speed is present (S122).

On the other hand, when the intake cylinder 3 is not the cylinder 3*a*, 3*c*, or 3*d* with the TDC difference of 60 degrees in S110 (S110, NO), the instruction determining unit 27 determines whether the intake cylinder 3 is the cylinder 3*b* (#2) or 3*h* (#8) with the TDC difference of 90 degrees (S116). Then, when the intake cylinder 3 is the cylinder 3*b* or 3*h* with the TDC difference of 90 degrees (S116, YES), the instruction determining unit 27 determines whether the intake air pressure difference ΔP exceeds a variation threshold DPth2 corresponding to the cylinder 3 with the TDC difference of 90 degrees (S118). Then, when the intake air pressure difference ΔP exceeds the variation threshold DPth2 (S118, YES), the instruction determining unit 27 determines that the instruction operation is present in step S114.

On the other hand, when the intake air pressure difference ΔP does not exceed the variation threshold DPth2 in S118 (S118, NO), the instruction determining unit 27 determines that no instruction operation is present in S122.

On the other hand, when the intake cylinder 3 is not the cylinder 3*b* or 3*h* with the TDC difference of 90 degrees in S116 (S116, NO), the instruction determining unit 27 determines that the intake cylinder 3 is the cylinder 3*e* (#5), 3*f* (#6), or 3*g* (#7) with the TDC difference of 120 degrees. Then, the instruction determining unit 27 determines whether the intake air pressure difference ΔP exceeds a variation threshold DPth3 corresponding to the cylinder 3 with the TDC difference of 120 degrees (S120). Then, when the intake air pressure difference ΔP exceeds the variation threshold DPth3 (S120, YES), the instruction determining unit 27 determines that the instruction operation is present in step S114.

On the other hand, when the intake air pressure difference ΔP does not exceed the variation threshold DPth3 in S120 (S120, NO), the instruction determining unit 27 determines that no instruction operation is present in S122.

Then, when the instruction determining unit 27 determines that "an instruction operation is present" in step S114, the injection control unit 26 performs the transient response control. That is, the injection control unit 26 applies the fuel injection quantity Vi determined for the intake cylinder 3 also to the fuel injection quantity of the cylinders 3 other than the intake cylinder 3 (S124). Specifically, as described above, the injection control unit 26 resets (or overwrites) the fuel injection quantity already set to the injector driving circuit 23 for the cylinders 3 other than the intake cylinder 3 with the fuel injection quantity Vi. Then, the injection control unit 26 determines whether the power of the injection controller 1 has been turned off (S126). When the power of the injection controller 1 has been turned off, the injection control unit 26 finishes the process. On the other hand, when the power of the injection controller 1 has not been turned off (S126, NO), the injection control unit 26 returns the process to step S100.

On the other hand, when the instruction determining unit 27 determines that "no instruction operation is present" in step S122, the injection control unit 26 shifts the process to step S126 without performing the transient response control.

Here, in the flowchart shown in FIG. 7, the process of step S102 corresponds to the acquiring step in the present disclosure. Also, the process of step S104 corresponds to the injection quantity determining step in the present disclosure. Also, the processes from steps S108 to S122 correspond to the instruction determining step in the present disclosure. Also, the process of step S124 corresponds to the transient response step in the present disclosure.

[5. Other Embodiments]

The injection controller 1 may not perform the transient response control when a boat equipped with the engine 2, which is an outboard motor, detects an obstacle on or under the surface of the water during navigation or when the boat is berthing or navigating in a marina. Accordingly, when the boat is in a situation where the stability of the rotation speed of the engine 2 should be more important than the responsivity of the engine 2 as described above, it is possible to achieve excellent operability to the engine 2 and reduce the possibility of collision with surrounding objects. The injection controller 1 may, for example, acquire positional information of an obstacle using an obstacle detector such as a radar provided on the boat or acquire information indicating that the boat is berthing or navigating in a marina from a navigation device using GPS or the like.

In addition, the injection controller 1 may not perform the transient response control when the skill level of a driver of a boat equipped with the engine 2, which is an outboard motor, is low. Accordingly, it is possible to keep the response speed of the engine 2 at a level commensurate with the skill of the driver to increase safety. The injection controller 1 may, for example, determine the skill level of the driver on the basis of information about the skill level of the driver, the information being input to a navigation device or the like provided on the boat (e.g., information of years of driving experience, accumulated navigation time, or the like of the driver).

In addition, the injection controller 1 may not perform the transient response control in the event of inclement weather on the day when a boat equipped with the engine 2, which is an outboard motor, navigates (e.g., in the event of strong winds, rain, or high waves). Accordingly, when the boat can be adversely affected by the surrounding environment, the response speed of the engine 2 is not increased, thereby increasing the safety of navigation. The injection controller 1 may, for example, communicate with a weather information server to acquire information about weather conditions on the day when the above-mentioned boat navigates.

Note that the present invention is not limited to the configurations of the embodiments described above and can be performed in various modes without departing from the gist of the invention.

[6. Configurations Supported by the Above Embodiments]

The embodiments described above support the following configurations.

(Configuration 1) An injection controller that controls fuel injection in each cylinder of an engine including a plurality of cylinders, the injection controller including: a processor that determines a fuel injection quantity in each of the cylinders; and a memory, in which the processor acquires an intake air pressure of each of the cylinders from an intake air pressure sensor provided in an intake path, determines, for each of the cylinders, on the basis of the intake air pressure in one intake stroke, a fuel injection quantity for a next intake stroke in the cylinder, determines whether an instruction operation for making an instruction to increase or reduce a rotation speed of the engine has been performed on the basis of the intake air pressure in one of the cylinders, and performs transient response control to apply the fuel injection quantity for the next intake stroke in the one cylinder also to the fuel injection quantity in the next intake stroke in the cylinders other than the one cylinder when it is determined that the instruction operation has been performed.

According to the injection controller of configuration 1, in a multi-cylinder engine in which, on the basis of the intake air pressure in each cylinder, the fuel injection quantity at the intake air pressure is controlled, the responsivity of the engine to an instruction operation to increase or reduce the rotation speed can be enhanced.

(Configuration 2) The injection controller according to configuration 1, in which the processor determines that the instruction operation has been performed when a predetermined variation threshold is exceeded on the basis of the intake air pressure of the one cylinder and the intake air pressure of another one of the cylinders that starts the intake stroke immediately before the intake stroke of the one cylinder.

According to the injection controller of configuration 2, since the instruction operation is detected on the basis of the intake air pressure of two cylinders, it is possible to eliminate the necessity of a component such as an accelerator sensor and simplify the engine configuration.

(Configuration 3) The injection controller according to configuration 1 or 2, in which the processor acquires the rotation speed of the engine from a rotation sensor that detects the rotation speed of the engine, and determines whether the instruction operation has been performed on condition that the rotation speed of the engine is less than a predetermined upper limit rotation speed threshold and the intake air pressure in the one cylinder is less than a predetermined upper limit pressure threshold.

According to the injection controller of configuration 3, it is possible to prevent incorrect determination of the presence or absence of the instruction operation in a state in which the engine is at high rotation speed or high load and the intake air pressure of the cylinder is likely to fluctuate.

(Configuration 4) The injection controller according to any one of configurations 1 to 3, in which the processor acquires the rotation speed of the engine from a rotation sensor that detects the rotation speed of the engine, and does not perform the transient response control when the rotation speed of the engine is equal to or less than a predetermined lower limit rotation speed threshold or the intake air pressure in the one cylinder is equal to or less than a predetermined lower limit pressure threshold.

According to the injection controller of configuration 4, during low-rotation-speed or low-load operation in which the stability of the rotation speed of the engine can be more important than the responsivity of the engine, it is possible to prevent the responsivity of the engine from being unnecessarily increased by execution of the transient response control and achieve excellent operability.

(Configuration 5) The injection controller according to any one of configurations 1 to 4, in which the intake air pressure sensor detects an intake air pressure inside an intake manifold that distributes, to a plurality of the cylinders, air flowing into the intake manifold from an intake pipe through an intake valve, and the processor acquires, for each of the cylinders, an intake air pressure detected by the intake air pressure sensor at a timing when a piston of the cylinder reaches a top dead center position in the intake stroke of the cylinder as the intake air pressure in the cylinder.

According to the injection controller of configuration 5, since the intake air pressure inside the intake manifold, the intake manifold being located closer to the cylinder than the intake pipe is, is detected, the responsivity of intake air pressure detection can be enhanced compared to the configuration that detects the intake air pressure inside the intake pipe.

(Configuration 6) The injection controller according to any one of configurations 1 to 5, in which explosion intervals between a plurality of the cylinders are irregular intervals in the engine.

According to the injection controller of configuration 6, in an irregular interval explosion engine with small crank angle dependent torque variation, the responsivity to an instruction operation to increase or reduce the rotation speed can be enhanced.

(Configuration 7) The injection controller according to configuration 6, in which the processor determines that the instruction operation has been performed when an absolute value of a difference between the intake air pressure of the one cylinder and the intake air pressure of another one of the cylinders that starts the intake stroke immediately before the intake stroke of the one cylinder exceeds a predetermined variation threshold, and the variation threshold for intake air pressure variation, the variation threshold being used to determine presence or absence of the instruction operation, has different values corresponding to a difference in crank angle at a top dead center in the intake stroke between two of the cylinders in which the intake air pressure used to calculate the intake air pressure variation is measured.

According to the injection controller of configuration 7, for example, a larger variation threshold can be used to determine the presence or absence of the instruction operation between the intake strokes of two cylinders with a larger difference in top dead center crank angle in which the intake air pressure rise before intake air pressure detection can be increased due to a longer delay time from the execution of the instruction operation to the intake air pressure detection. Thus, according to the injection controller of configuration 7, determination of the presence or absence of the instruction operation can be more appropriately performed also in an irregular interval explosion engine in which the differences in top dead center crank angle between cylinders are irregular intervals.

(Configuration 8) The injection controller according to any one of configurations 1 to 7, in which the engine is an engine for an outboard motor.

According to the injection controller of configuration 8, in an outboard motor engine, it is possible to enhance the responsivity to an instruction to increase or reduce the engine rotation speed and enhance the responsivity of acceleration or deceleration of the boat.

(Configuration 9) An injection control method performed by a processor that controls a fuel injection quantity in each cylinder of an engine including a plurality of cylinders, the injection control method including: an acquiring step of acquiring an intake air pressure of each of the cylinders from an intake air pressure sensor provided in an intake path; an injection quantity determining step of determining, for each of the cylinders, on the basis of the intake air pressure in one intake stroke, a fuel injection quantity in a next intake stroke in the cylinder; an instruction determining step of determining whether an instruction operation for making an instruction to increase or reduce a rotation speed of the engine has been performed on the basis of the intake air pressure in one of the cylinders; and a transient response step of performing transient response control to apply the fuel injection quantity for the next intake stroke in the one cylinder determined in the injection quantity determining step also to the fuel injection quantity in the next intake stroke in the cylinders other than the one cylinder when it is determined that the instruction operation has been performed in the instruction determining step.

According to the injection control method of configuration 9, in a multi-cylinder engine in which, on the basis of the intake air pressure in each cylinder, the fuel injection quantity at the intake air pressure is controlled, the responsivity of the engine to an instruction operation to increase or reduce the rotation speed can be enhanced.

REFERENCE SIGNS LIST

1: injection controller
2: engine
3, 3*a*, 3*b*, 3*c*, 3*d*, 3*e*, 3*f*, 3*g*, 3*h*: cylinder
4, 4*a*, 4*b*, 4*c*, 4*d*, 4*e*, 4*f*, 4*g*, 4*h*: injector
5: fuel tank
6: fuel pipe
7: fuel pump
8, 8*a*, 8*b*: intake pipe
9, 9*a*, 9*b*: intake valve
10: intake manifold
11: intake air pressure sensor
12: crank shaft
13: rotation sensor
14: cam shaft
15, 15*a*, 15*b*: TDC sensor
16, 16*a*, 16*b*: exhaust pipe
20: processor
21: memory
22: input/output interface
23: injector driving circuit
24: program
25: injection quantity map
26: injection control unit
27: instruction determining unit

What is claimed is:

1. An injection controller that controls fuel injection in each cylinder of an engine including a plurality of cylinders, the injection controller comprising:
- a processor that determines a fuel injection quantity in each of the cylinders; and
- a memory, wherein
- the processor
- acquires an intake air pressure of each of the cylinders from an intake air pressure sensor provided in an intake path,
- determines, for each of the cylinders, on the basis of the intake air pressure in one intake stroke, a fuel injection quantity for a next intake stroke in the cylinder,
- determines whether an instruction operation for making an instruction to increase or reduce a rotation speed of the engine has been performed on the basis of the intake air pressure in one of the cylinders, and
- performs transient response control to apply the fuel injection quantity for the next intake stroke in the one cylinder also to the fuel injection quantity in the next intake stroke in the cylinders other than the one cylinder when it is determined that the instruction operation has been performed.

2. The injection controller according to claim 1, wherein the processor determines that the instruction operation has been performed on the basis of the intake air pressure of the one cylinder and the intake air pressure of another one of the cylinders that starts the intake stroke immediately before the intake stroke of the one cylinder.

3. The injection controller according to claim 1, wherein the processor
- acquires the rotation speed of the engine from a rotation sensor that detects the rotation speed of the engine, and
- determines whether the instruction operation has been performed on condition that the rotation speed of the engine is less than a predetermined upper limit rotation speed threshold and the intake air pressure in the one cylinder is less than a predetermined upper limit pressure threshold.

4. The injection controller according to claim 1, wherein the processor acquires the rotation speed of the engine from a rotation sensor that detects the rotation speed of the engine, and does not perform the transient response control when the rotation speed of the engine is equal to or less than a predetermined lower limit rotation speed threshold or the intake air pressure in the one cylinder is equal to or less than a predetermined lower limit pressure threshold.

5. The injection controller according to claim 1, wherein the intake air pressure sensor detects an intake air pressure inside an intake manifold that distributes, to the cylinders, air flowing into the intake manifold from an intake pipe through an intake valve, and the processor acquires, for each of the cylinders, an intake air pressure detected by the intake air pressure sensor at a timing when a piston of the cylinder reaches a top dead center position in the intake stroke of the cylinder as the intake air pressure in the cylinder.

6. The injection controller according to claim 1, wherein explosion intervals between a plurality of the cylinders are irregular intervals in the engine.

7. The injection controller according to claim 6, wherein the processor determines that the instruction operation has been performed when an intake air pressure variation exceeds a predetermined variation threshold, wherein the intake air pressure variation is an absolute value of a difference between the intake air pressure of the one cylinder and the intake air pressure of another one of the cylinders that starts the intake stroke immediately before the intake stroke of the one cylinder, and the predetermined variation threshold being used to determine presence or absence of the instruction operation, has different values corresponding to a difference in crank angle at a top dead center in the intake stroke between two of the cylinders in which the intake air pressure used to calculate the intake air pressure variation is measured.

8. The injection controller according to claim 1, wherein the engine is an engine for an outboard motor.

9. An injection control method performed by a processor that controls a fuel injection quantity in each cylinder of an engine including a plurality of cylinders, the injection control method comprising:

an acquiring step of acquiring an intake air pressure of each of the cylinders from an intake air pressure sensor provided in an intake path;

an injection quantity determining step of determining, for each of the cylinders, on the basis of the intake air pressure in one intake stroke, a fuel injection quantity in a next intake stroke in the cylinder;

an instruction determining step of determining that an instruction operation for making an instruction to increase or reduce a rotation speed of the engine has been performed on the basis of the intake air pressure in one of the cylinders; and a transient response step of performing transient response control to apply the fuel injection quantity for the next intake stroke in the one cylinder determined in the injection quantity determining step also to the fuel injection quantity in the next intake stroke in the cylinders other than the one cylinder when it is determined that the instruction operation has been performed in the instruction determining step.

* * * * *